United States Patent
Okuzono

(10) Patent No.: US 12,001,740 B2
(45) Date of Patent: Jun. 4, 2024

(54) PRINTER, COMPUTER-READABLE MEDIUM, AND METHOD TO PROPERLY PERFORM USER CLEANING

(71) Applicant: BROTHER KOGYO KABUSHIKI KAISHA, Nagoya (JP)

(72) Inventor: Taisei Okuzono, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/678,219

(22) Filed: Feb. 23, 2022

(65) Prior Publication Data
US 2022/0269458 A1 Aug. 25, 2022

(30) Foreign Application Priority Data

Feb. 25, 2021 (JP) .................................. 2021-028170

(51) Int. Cl.
- *G06F 3/12* (2006.01)
- *B41J 29/17* (2006.01)
- *H04N 1/00* (2006.01)

(52) U.S. Cl.
CPC ............ *G06F 3/1239* (2013.01); *B41J 29/17* (2013.01); *G06F 3/121* (2013.01); *G06F 3/1219* (2013.01); *G06F 3/1229* (2013.01); *G06F 3/1273* (2013.01); *H04N 1/00909* (2013.01)

(58) Field of Classification Search
CPC ...... G06F 3/1239; G06F 3/121; G06F 3/1219; G06F 3/1229; G06F 3/1273; G06F 3/1285; B41J 29/17; B41J 2/175; H04N 1/00909
See application file for complete search history.

(56) References Cited

U.S. PATENT DOCUMENTS

| | | | | |
|---|---|---|---|---|
| 6,158,838 A | * | 12/2000 | Capurso | B41J 2/16552 347/29 |
| 6,293,645 B1 | * | 9/2001 | Kim | B41J 2/16579 347/19 |
| 2003/0090705 A1 | * | 5/2003 | Ferlitsch | G06Q 20/4037 358/1.18 |

(Continued)

FOREIGN PATENT DOCUMENTS

| JP | H115300 A | * | 1/1999 |
|---|---|---|---|
| JP | 2013-163301 A | | 8/2013 |

*Primary Examiner* — Huo Long Chen
(74) *Attorney, Agent, or Firm* — Scully, Scott, Murphy & Presser, P.C.

(57) ABSTRACT

A printer includes a container configured to store recording agent, a print head configured to eject the recording agent, and a controller configured to permit the printer to perform printing until a print permission amount, different from a remaining amount of the recording agent in the container, reaches a first threshold. The print permission amount is information regarding a quantity, of the recording agent or sheets usable by the printer. The controller is further configured to receive an instruction to perform user cleaning to clean the print head by ejecting the recording agent from the print head, and in response to the receipt of the instruction to perform the user cleaning, cause the printer to perform the user cleaning when the print permission amount has not reached a second threshold, whereas restricting execution of the user cleaning when the print permission amount has reached the second threshold.

12 Claims, 9 Drawing Sheets

(56) References Cited

U.S. PATENT DOCUMENTS

| | | | |
|---|---|---|---|
| 2004/0136025 A1* | 7/2004 | Moriyama | H04N 1/00087 358/1.14 |
| 2007/0257954 A1* | 11/2007 | Nishizaka | B41J 2/17509 347/14 |
| 2009/0016748 A1* | 1/2009 | Ferlitsch | G03G 21/02 399/39 |
| 2010/0110119 A1* | 5/2010 | Taga | B08B 9/00 347/85 |

* cited by examiner

MANAGEMENT TABLES

USER MANAGEMENT TABLE

| User ID | us1 | us2 | us3 |
|---|---|---|---|
| Password | pw1 | pw2 | pw3 |
| Printable Number of Sheets | pr1 | pr2 | pr3 |

DEVICE MANAGEMENT TABLE

| Device ID | dv1 | dv2 | dv3 |
|---|---|---|---|
| Remaining Ink Amount | ink1 | ink2 | ink3 |
| Replacement Request Information | × | ○ | ○ |
| Activation Information | ○ | × | ○ |
| Device Replacement Information | × | ○ | × |
| Device Settings | dc1 | dc2 | dc3 |

PRINTER, COMPUTER-READABLE MEDIUM, AND METHOD TO PROPERLY PERFORM USER CLEANING

CROSS REFERENCE TO RELATED APPLICATIONS

This application claims priority under 35 U.S.C. § 119 from Japanese Patent Application No. 2021-028170 filed on Feb. 25, 2021. The entire subject matter of the application is incorporated herein by reference.

BACKGROUND

A printer has been known that performs cleaning of a print head by ejecting recording agent from the print head. Specifically, for instance, the printer is configured to start so-called user cleaning to eject ink from the print head in response to receipt of a user's instruction to perform the cleaning.

SUMMARY

In the meantime, a printer has been known that is configured to perform printing within a range authorized by print permission amount. The print permission amount is different from a remaining amount of recording agent stored in the printer. For instance, the print permission amount is information regarding a quantity, of recording agent or sheets usable for printing by the printer. In such a configuration, for instance, if the user cleaning is performed when the print permission amount is such a value that the printer is unable to complete requested printing, there is a concern that the recording agent consumed by the user cleaning may be wasted. Moreover, there is also a concern that a remaining amount of the recording agent may be insufficient for a printable number of pages that is granted by the print permission amount, after the recording agent has been consumed by the user cleaning.

Aspects of the present disclosure are advantageous to provide one or more improved techniques that make it possible to properly perform user cleaning.

According to aspects of the present disclosure, a printer is provided, which includes a container, a print head, and a controller. The container is configured to store recording agent. The print head is configured to eject the recording agent. The controller is configured to permit the printer to perform printing until a print permission amount, different from a remaining amount of the recording agent in the container, reaches a first threshold. The print permission amount is information regarding a quantity, of the recording agent or sheets usable by the printer. The controller is further configured to receive an instruction to perform user cleaning to clean the print head by ejecting the recording agent from the print head. The controller is further configured to, in response to the receipt of the instruction to perform the user cleaning, cause the printer to perform the user cleaning when the print permission amount has not reached a second threshold, whereas restricting execution of the user cleaning when the print permission amount has reached the second threshold.

According to aspects of the present disclosure, further provided is a non-transitory computer-readable medium storing computer-readable instructions that are executable by a controller of a printer. The printer includes a container configured to store recording agent, and a print head configured to eject the recording agent. The instructions are configured to, when executed by the controller, cause the controller to permit the printer to perform printing until a print permission amount, different from a remaining amount of the recording agent in the container, reaches a first threshold. The print permission amount is information regarding a quantity, of the recording agent or sheets usable by the printer. The instructions are further configured to, when executed by the controller, cause the controller to receive an instruction to perform user cleaning to clean the print head by ejecting the recording agent from the print head. The instructions are further configured to, when executed by the controller, cause the controller to, in response to the receipt of the instruction to perform the user cleaning, cause the printer to perform the user cleaning when the print permission amount has not reached a second threshold, whereas restricting execution of the user cleaning when the print permission amount has reached the second threshold.

According to aspects of the present disclosure, further provided is a method implementable on a controller of a printer. The printer includes a container configured to store recording agent, and a print head configured to eject the recording agent. The method includes permitting the printer to perform printing until a print permission amount, different from a remaining amount of the recording agent in the container, reaches a first threshold. The print permission amount is information regarding a quantity, of the recording agent or sheets usable by the printer. The method further includes receiving an instruction to perform user cleaning to clean the print head by ejecting the recording agent from the print head. The method further includes causing, in response to the receipt of the instruction to perform the user cleaning, the printer to perform the user cleaning when the print permission amount has not reached a second threshold, whereas restricting execution of the user cleaning when the print permission amount has reached the second threshold.

BRIEF DESCRIPTION OF THE DRAWINGS

FIG. 2 shows an example of management tables stored in the server.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

A printing system in a first illustrative embodiment according to aspects of the present disclosure will be described with reference to the relevant drawings.

Figure 1:
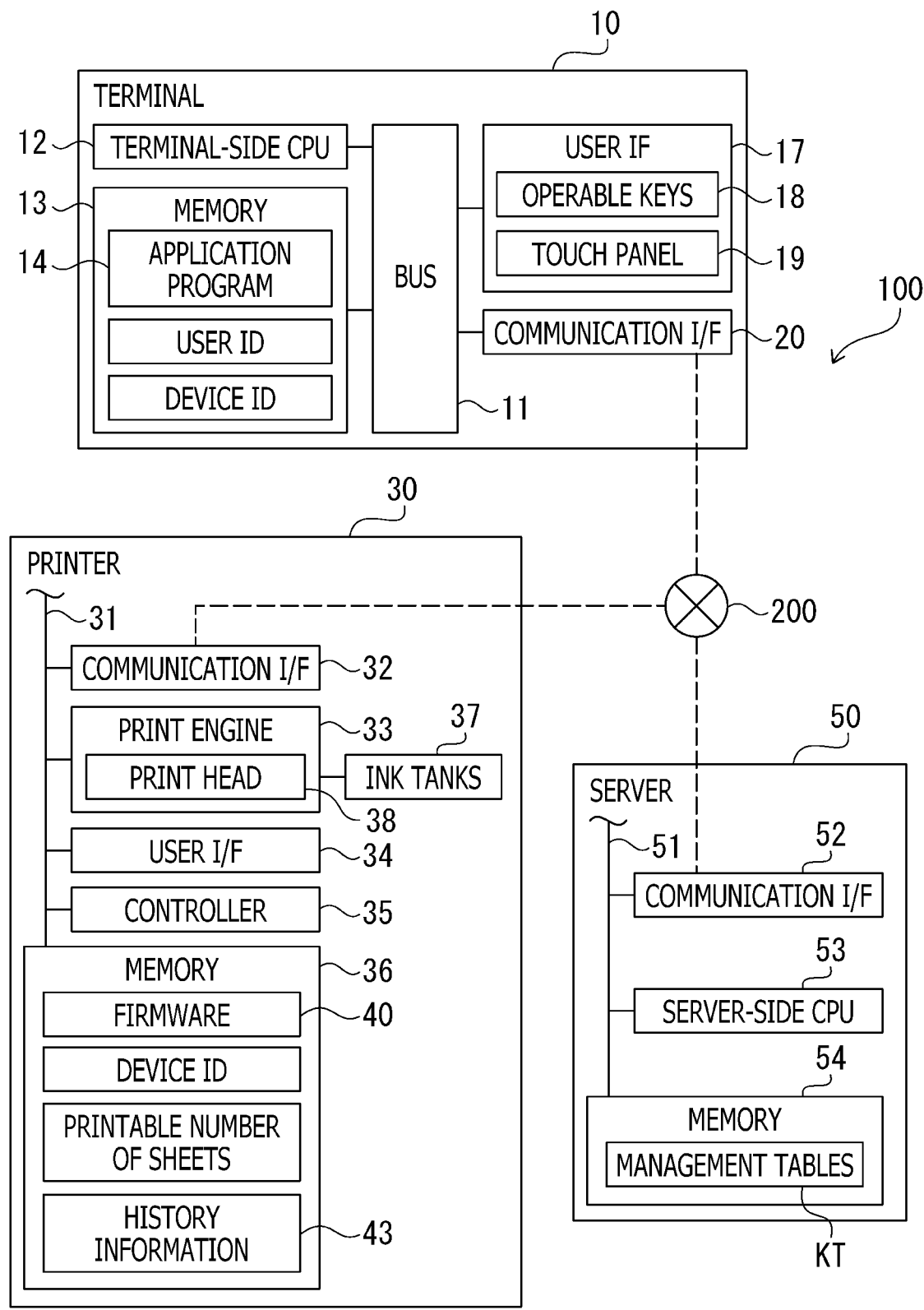
FIG. 1 is a block diagram schematically showing a configuration of a printing system including a terminal, a printer, and a server.

A printing system 100 shown in FIG. 1 includes a terminal 10, a printer 30, and a server 50. The terminal 10, the printer 30, and the server 50 are interconnected via a network 20. In the first illustrative embodiment, the network 200 may include one or more different networks such as the Internet and a LAN ("LAN" is an abbreviation for "Local Area Network). Moreover, the network 200 may be a wired network, a wireless network, or a combination including a wired network and a wireless network.

The terminal 10 is a smart phone or a tablet terminal. The terminal 10 includes a bus 11, a terminal-side CPU 12, a memory 13, a user I/F ("I/F" is an abbreviation for "interface") 17, and a communication I/F 20. These elements included in the terminal 10 are communicably interconnected via the bus 11.

The user I/F 17 includes operable keys 18 and a touch panel 19. The touch panel 19 includes a touch sensor. The touch panel 19 is configured to output a signal according to a result of detection by the touch sensor. The term "touch" in the present disclosure includes overall operations to bring an input medium into contact with a display screen of the touch panel 19. Moreover, the concept of the "touch" may include bringing the input medium in proximity to or within a very short distance from the display screen of the touch panel 19. Furthermore, examples of the input medium may include, but are not limited to, a user's finger, a stylus, and a touch pen.

The communication I/F 20 is configured to connect the terminal 10 with the network 200 in accordance with a particular communication protocol. For instance, the communication I/F 20 may perform Wi-Fi wireless communication ("Wi-Fi" is a registered trademark of the non-profit Wi-Fi Alliance) based on the IEEE 802.11 standard and equivalent standards. Moreover, for instance, the communication I/F 20 may perform, with the printer 30, short-range wireless communication such as Bluetooth communication ("Bluetooth" is a registered trademark of Bluetooth SIG, Inc.). Furthermore, the communication I/F 20 may perform wireless communication using a mobile communication system via a base station.

The memory 13 stores a user ID, a device ID, an OS (not shown, "OS" is an abbreviation for "Operating System"), and an application program 14. The user ID is information for identifying a user who is authorized to receive a printing service from the server 50. The device ID is information for identifying a device to receive the printing service from the server 50. The user ID and the device ID will be described later in detail. The terminal-side CPU 12 is configured to receive the printing service from the server 50 by executing the application program 14 under execution of the OS. The printing service will be described later. Hereinafter, the application program 14 may be referred to simply as the "application 14." Moreover, the CPU executing a program may be referred to simply with a name of the program. For instance, a description "the application 14" may denote "the terminal-side CPU 12 that executes the application 14." The user ID stored in the memory 13 is information for uniquely identifying the terminal 10.

The present disclosure basically shows processes to be performed by CPUs in accordance with instructions described in programs. Namely, each of processes such as "determining," "judging," "extracting," "selecting," "calculating," "specifying," "identifying," "obtaining," "acquiring," "receiving," "accepting," and "controlling" in the following description may represent a process by a CPU or a controller. Processes by CPUs may include hardware control via OSs. It is noted that "obtaining" or "acquiring" may be used as a concept that does not necessarily require a request. Namely, a process of each program receiving data without making a request for the data may be included in a concept of "a corresponding CPU obtaining (acquiring) the data." Further, "data" in the present disclosure may be expressed in a computer-readable format. Additionally, a plurality of pieces of data having substantially the same meaning or content but expressed in different formats shall be treated as the same data. The same may apply to "information" in the present disclosure.

Next, the printer 30 will be described. The printer 30 includes a bus 31, a communication I/F 32, a print engine 33, a user I/F 34, a controller 35, a memory 36, and a plurality of ink tanks 37. These elements included in the printer 30 are communicably interconnected via the bus 31.

The communication I/F 32 has substantially the same configuration as the communication I/F 20 of the terminal 10. The user I/F 34 has substantially the same configuration as the user I/F 17 of the terminal 10. Specifically, the user I/F 34 includes a touch panel, and operable keys as physical keys.

The print engine 33 is configured to perform a printing operation to print an image on a recording medium such as a sheet or a disk. The print engine 33 is an ink-jet type device to eject ink as recording agent onto the recording medium. The print engine 33 is connected with the plurality of ink tanks 37 to store ink. In the first illustrative embodiment, there are four types of ink (e.g., cyan, magenta, yellow, and black). For each type of ink, a corresponding one of the plurality of ink tanks 37 is provided. When a remaining amount of ink stored in an ink tank 37 is insufficient, a request for replacement of the printer 30 needs to be made to a vendor. In the first illustrative embodiment, each ink tank 37 is unable to be re-filled with ink. In addition, each ink tank 37 is fixedly attached to the printer 30 in an unremovable manner.

The controller 35 includes a CPU and an ASIC ("ASIC" is an abbreviation for "Application Specific Integrated Circuit"). The controller 35 is configured to control an operation of each of the elements (e.g., the print engine 33 and the user I/F 34) included in the printer 30. The memory 36 stores various programs and various types of data. For instance, the memory 36 may include one or more storage devices such as RAMs, ROMs, and flash memories. Moreover, the memory 36 may include a computer-readable storage medium that is readable by the controller 35. Examples of the computer-readable storage medium may include, but are not limited to, recording media such as a CD-ROM and a DVD-ROM.

The memory 36 stores firmware 40 that is a control program for the printer 30. The controller 35 executes the firmware 40, thereby performing a printing process. The memory 36 stores information used in a below-mentioned printing service. Specifically, the memory 36 stores a "device ID" and a "printable number of sheets." The device ID is the same as the device ID stored in the memory 13 of the terminal 10. The printable number of sheets will be described later.

Further, the memory 36 stores history information 43. The history information 43 is information to record printing modes in printing processes heretofore performed by the printer 30. Specifically, the history information 43 contains, as a printing mode, the printing date and time, print settings, and the number of pages printed per job (i.e., the number of pages printed for each single job). The print settings include "print quality," "sheet size," and "color settings." The "print quality" is information representing the quality of images formed on sheets. For instance, the print quality becomes higher in the order of "high speed," "normal," "high quality," and "highest quality." Meanwhile, in the order of "high speed," "normal," "high quality," and "highest quality," an amount of ink ejected increases. The "sheet size" is information representing a set size of sheets used for printing. It is noted that possible combinations of the "print quality" and the "sheet size" are limited. Namely, selectable values for the "print quality" are limited according to a selected value of the "sheet size."

Subsequently, a configuration of the server 50 will be described. The server 50 includes a bus 51, a communication I/F 52, a server-side CPU 53, and a memory 54. These elements included in the server 50 are communicably interconnected via the bus 51. The server 50 is configured to provide various services to the terminal 10. More specifically, in the first illustrative embodiment, the server 50 is configured to provide a printing service to a user who operates the terminal 10.

The user makes a request for the printing service to the vendor by operating the terminal 10. In response to receiving the request from the user, the vendor sends the printer 30 to the user. The printer 30, sent by the vendor to the user, is filled with a necessary amount of ink for printing a certain number of sheets (e.g., 2000 sheets+α) that is equal to or more than a particular printable number of sheets granted to the user. The printable number of sheets indicates the number of sheets that the user is permitted to print by the printer 30, and indicates a value different from an amount of ink stored in each ink tank 37. Specifically, to receive the printing service from the server 50, the terminal 10 obtains a current printable number of sheets from the server 50. The terminal 10 is permitted to cause the printer 30 to perform printing until the printable number of sheets reaches a first threshold TH1. In the first illustrative embodiment, the first threshold TH1 is "0." Therefore, in this printing service, the user does not need to perform troublesome operations such as filling the printer 30 with ink and replacing an ink cartridge, during a period of time from when the user has obtained the printer 30 until when the user starts printing for the printable number of sheets granted to the user after payment of an initial fee. If the user wants to print more than the particular printable number of sheets granted after the payment of the initial fee, the user may pay an additional charge to the server 50, thereby purchasing an additional printable number of sheets to increase the printable number of sheets. Hereinafter, the newly-purchased additional printable number of sheets may be referred to as a "charge number of sheets." Afterward, when the remaining amount of ink in the printer 30 is about to be insufficient, the user may send to the server 50 a request for replacement of the printer 30. Thereby, the user is allowed to continue the printing service using a new printer 30 sent by the vendor.

The memory 54 of the server 50 stores therein management tables KT. As shown in FIG. 2, the management tables KT store necessary information for using the printing service. The management tables KT include a user management table KT1 and a device management table KT2. The user management table KT1 stores information regarding users who use the printing service. Specifically, the user management table KT1 contains user IDs each of which is registered in association with a password and a printable number of sheets. Each password is used when a corresponding user uses the application 14, and is registered in the server 50 at the time of initial setting of the printer 30.

The device management table KT2 stores information regarding devices. Specifically, the device management table KT2 contains device IDs each of which is registered in association with a remaining ink amount, replacement request information, activation information, device replacement information, and device settings.

Each remaining ink amount indicates the remaining amount of ink in a corresponding device (e.g., the printer 30), and is transmitted by the printer 30 at a particular timing. The replacement request information indicates whether a request for replacement of the printer 30 has been sent to the server 50. When the replacement request information is set to an ON state "o," the replacement request information indicates that a request for replacement of the printer 30 has already been sent. Meanwhile, when the replacement request information is set to an OFF state "x," the replacement request information indicates that a request for replacement of the printer 30 has not yet been sent.

The activation information shows to the server 50 whether the initial setting of the printer 30 has been completed. When the activation information is set to an ON state "o," the activation information indicates that the printer 30 is allowed to perform printing. Meanwhile, when the activation information is set to an OFF state "x," the activation information indicates that the printer 30 is restricted from performing printing.

The device replacement information indicates whether replacement of the printer 30 has already been completed after transmission of a request for replacement of the printer 30. When the device replacement information is set to an ON state "o," the device replacement information indicates that replacement of the printer 30 has already been completed. Meanwhile, when the device replacement information is set to an OFF state "x," the device replacement information indicates that replacement of the printer 30 has not yet been completed. The device settings indicate available functions (e.g., copying and scanning) of the printer 30 and settings (e.g., a sheet size, color/monochrome, and a magnification) for each function.

Figure 3:
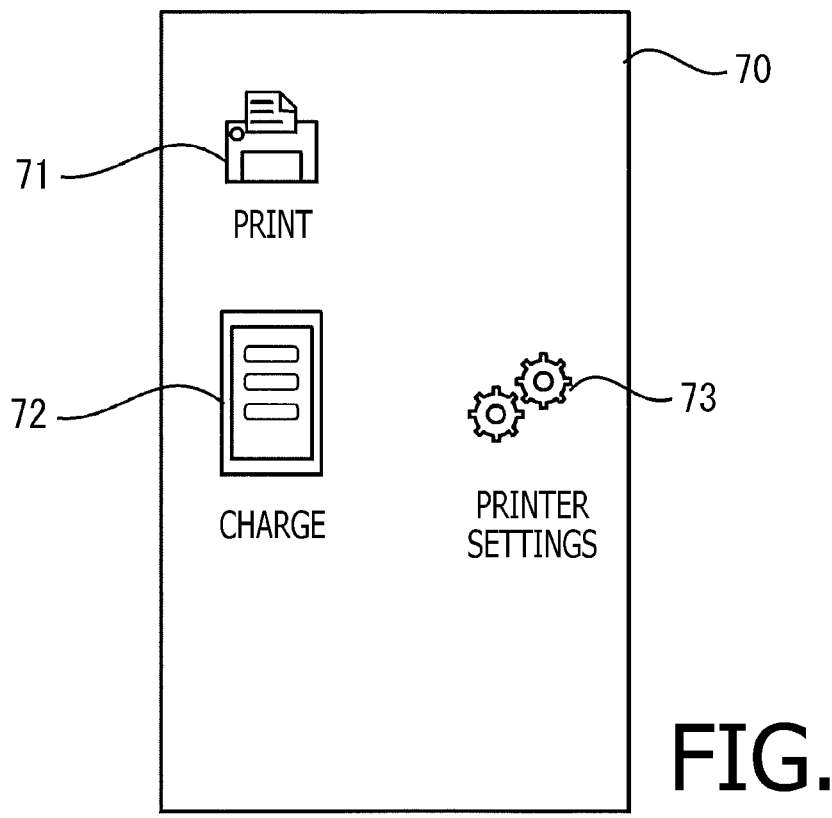
FIG. 3 shows an example of a top screen displayed on the terminal.

Next, the printing service using the printing system 100 will be described. To perform printing in the printing service, the user activates the application 14 and causes, via the application 14, the touch panel 19 of the terminal 10 to display a top screen 70 (see FIG. 3). The top screen 70 includes a print icon 71, a charge icon 72, and a printer settings icon 73. The print icon 71 is an operable object to be operated by the user to cause the printer 30 to perform printing in the printing service. The charge icon 72 is an operable object to be operated by the user to purchase the charge number of sheets from the server 50. The printer settings icon 73 is an operable object to be operated by the user to change setting information for the printer 30.

In response to detecting that the print icon 71 has been operated on the top screen 70, the application 14 causes the touch panel 19 to display a print execution screen (not shown). Then, on the print execution screen, the application 14 is enabled to receive user operations to input pages to be printed and the print settings. In response to detecting that a print instruction operation has been performed on the print execution screen, the application 14 sends a print file to the printer 30, thereby causing the printer 30 to start printing. Specifically, the application 14 is allowed to cause the printer 30 to perform printing up to an upper limit number of sheets as the printable number of sheets stored in the user management table KT1. Namely, the printable number of sheets is reduced for the number of sheets printed by the printer 30 being subtracted therefrom.

Figure 4:
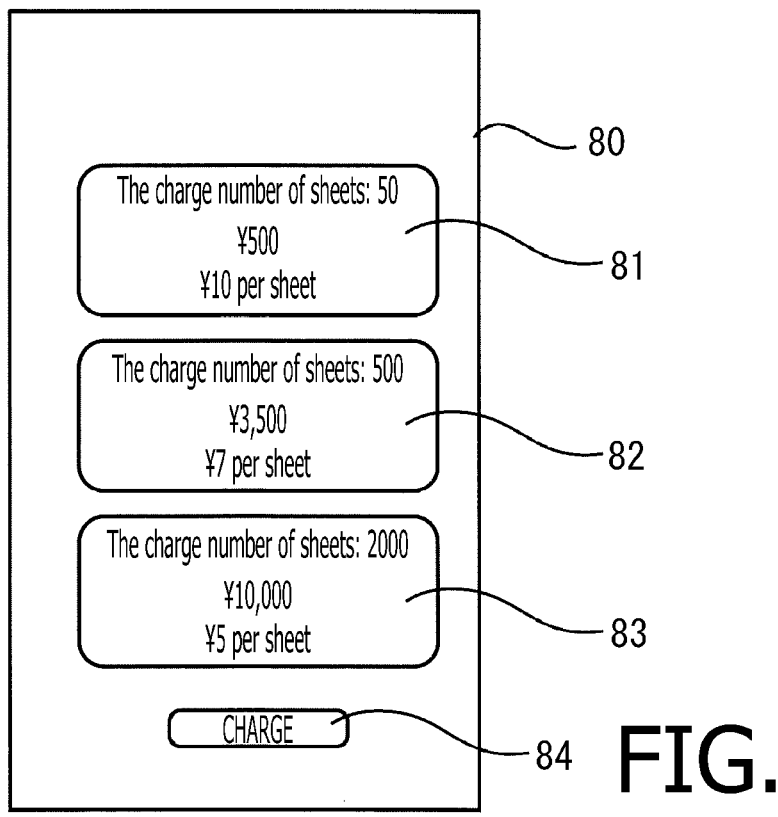
FIG. 4 shows an example of a number-of-sheets selecting screen.

Moreover, in response to detecting that the charge icon 72 has been operated on the top screen 70, the application 14 causes the touch panel 19 to display a number-of-sheets selecting screen 80 (see FIG. 4). The number-of-sheets selecting screen 80 is configured to receive a user's operation to select a charge number of sheets. The number-of-sheets selecting screen 80 will be described later in detail.

Next, an explanation will be provided of processes to be performed by the terminal 10, the printer 30, and the server 50, to purchase the charge number of sheets from the server 50. In response to the charge icon 72 being operated on the top screen 70, the application 14 starts a process shown in FIG. 5.

In S10, the application 14 sends to the server 50 a request for the activation information along with the device ID stored in the memory 14. In addition, the application 14 may send to the server 50 a token for identifying the user ID of the terminal 10 that is a sender of the request for the activation information, along with the request for the activation information.

In reply to the request for the activation information received from the terminal 10, in S11, the server-side CPU 53 of the server 50 sends to the terminal 10 the activation information that is associated with the device ID sent by the terminal 10 on the management tables KT.

In response to receipt of the activation information from the server 50, in S12, the application 14 determines whether activation has been completed for the printer 30 (i.e., whether the printer 30 is permitted to perform printing). As described above, when the activation information is in the ON state "o," the printer 30, identified by the device ID associated with the user ID, is permitted to perform printing. Meanwhile, when the activation information is in the OFF state "x," the printer 30 specified by the device ID is not permitted to perform printing. When determining that the activation has not been completed for the printer 30 (S12: No), the application 14 terminates the process shown in FIG. 5. Meanwhile, when determining that the activation has been completed for the printer 30 (S12: Yes), the application 14 proceeds to S13.

In S13, the application 14 performs a charge process. In the charge process, the application 14 sets a charge number of sheets to be purchased from the server 50, in response to a user operation. Specifically, in the charge process performed in S13, the application 14 causes the touch panel 19 to display a number-of-sheets selecting screen 80 (see FIG. 4).

The number-of-sheets selecting screen 80 shown in FIG. 4 includes selectable icons 81, 82, and 83, and a confirmation icon 84. The selectable icons 81, 82, and 83 are operable objects, each of which is configured to be operated by the user to select a corresponding one of available choices (e.g., 50 sheets, 500 sheets, and 2000 sheets) for the charge number of sheets. When the user operates one of the selectable icons 81, 82, and 83 and then operates the confirmation icon 84, the selection of the charge number of sheets is completed. In the first illustrative embodiment, each of the selectable icons 81, 82, and 83 displays thereon a specific number of sheets selectable as the charge number of sheets, as well as a fee charged for purchasing the charge number of sheets and an amount per sheet.

In response to receipt of a user operation to select the charge number of sheets in the charge process of S13, the application 14 proceeds to S14. In S14, the application 14 sends to the server 50 a charge request including the fee corresponding to the charge number of sheets selected in S13. The charge request is information for making a request for the purchase of the charge number of sheets from the server 50. In response to receipt of the charge request from the terminal 10, in S15, the server 50 sends to the terminal 10 a charge instruction indicating the charge number of sheets according to the fee included in the received charge request. The charge instruction is an instruction to add the purchased charge number of sheets to the printable number of sheets.

In S16, the application 14 of the terminal 10 forwards to the printer 30 the charge instruction received from the server 50. In response to receipt of the charge instruction, in S17, the firmware 40 of the printer 30 adds the charge number of sheets to the printable number of sheets, thereby updating the printable number of sheets.

Figure 6:
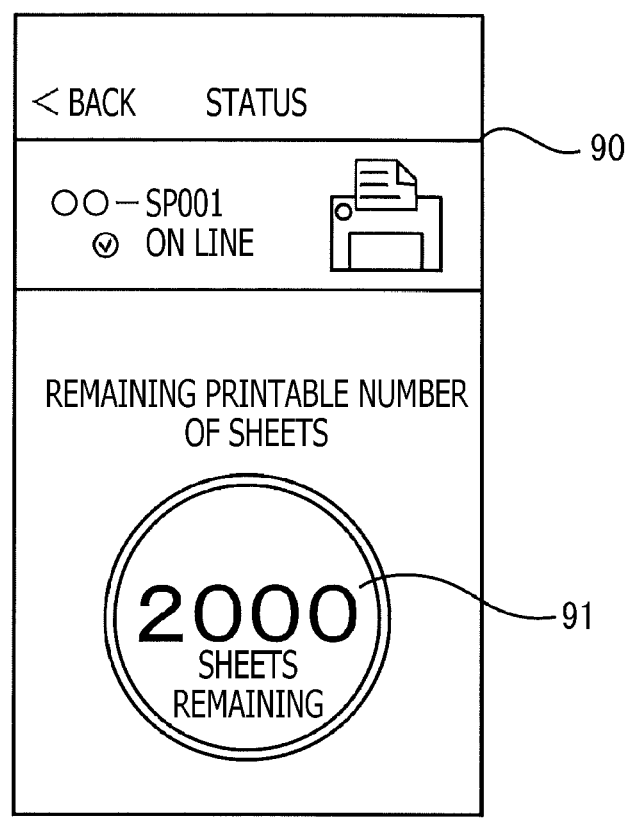
FIG. 6 shows an example of a screen displayed after the purchase of the charge number of sheets has been completed.

In S18, the firmware 40 sends a completion notification to the terminal 10. In S19, the application 14 of the terminal 10 forwards to the server 50 the completion notification received from the printer 30. In response to receipt of the completion notification, in S20, the server 50 increases the printable number of sheets stored in the management tables KT by the charge number of sheets Nc, thereby updating the printable number of sheets. In S21, the server-side CPU 53 sends an update completion notification to the terminal 10. FIG. 6 shows an example of a screen 90 displayed on the touch panel 19 after the application 14 has received the completion notification. The screen 90 shown in FIG. 6 includes a number-of-sheets display image 91 indicating the printable number of sheets updated by the purchase of the charge number of sheets.

Figure 7:
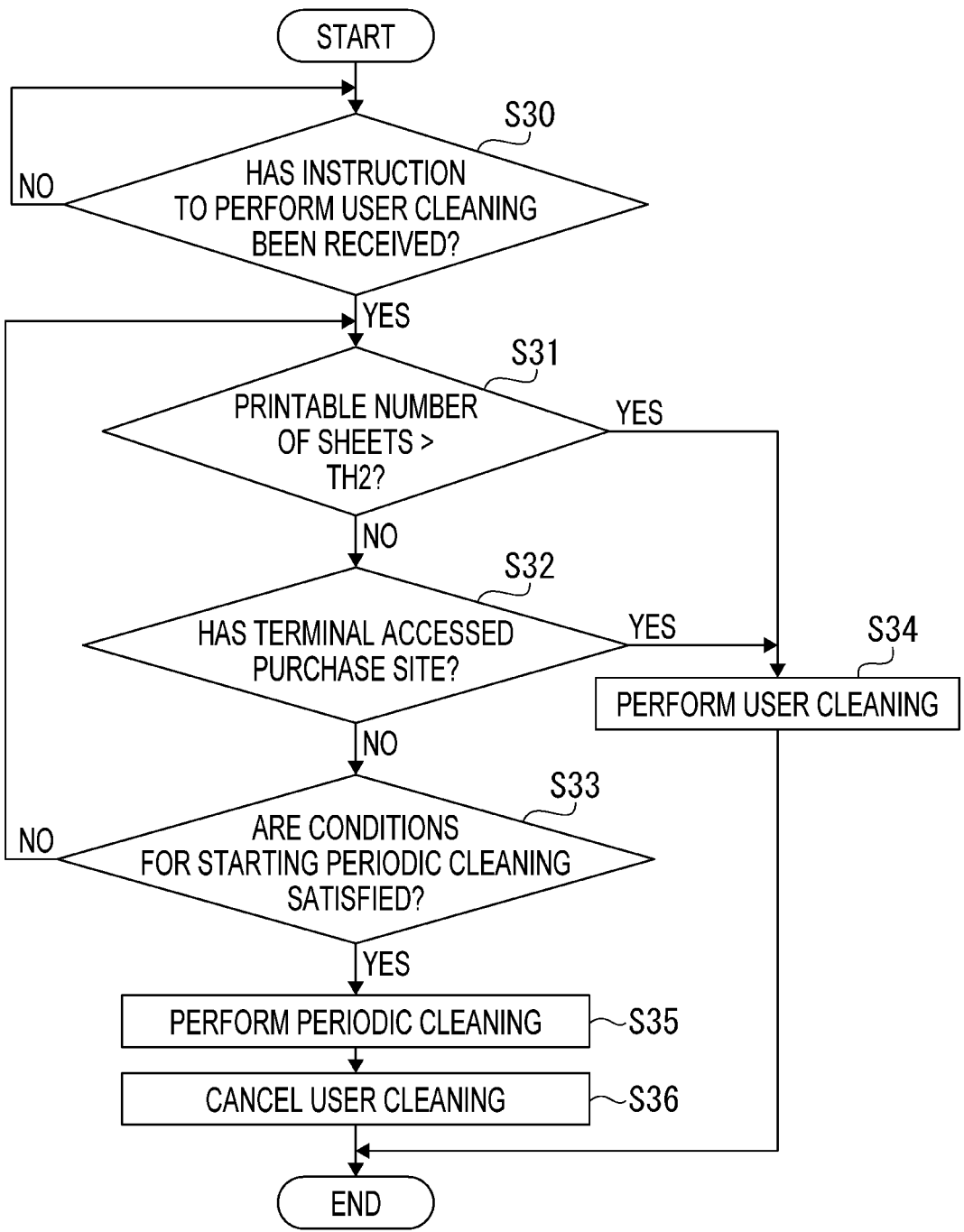
FIG. 7 is a flowchart showing a procedure of a process to be performed by the printer in response to receipt of an instruction to perform user cleaning.

Subsequently, referring to FIG. 7, an explanation will be provided of a process to be performed in response to receipt of an instruction to perform user cleaning for the printer 30. The user cleaning is a process for cleaning the print head 38 in response to receipt of a user's instruction operation. The user cleaning includes an operation to eject ink from the print head 38 and a wipe operation for the print head 38. The "wipe operation" is an operation to wipe off ink left on a nozzle surface of the print head 38 with a wiper. The process shown in FIG. 7 is performed by the firmware 40 (more exactly, by the controller 35 executing the firmware 40) when the user has performed an instruction operation to cause the printer 30 to perform the user cleaning in a state where the printer 30 is not receiving a print job.

In S30, the firmware 40 determines whether an instruction to perform the user cleaning has been received. For instance, when the printer settings icon 73 has been operated on the top screen 70, the application 14 may cause the touch panel 19 to display a specific screen configured to receive an instruction operation to cause the printer 30 to perform the user cleaning. In this case, in response to detecting on the specific screen the instruction operation to cause the printer 30 to perform the user cleaning, the application 14 may send the instruction to perform the user cleaning to the printer 30. In another instance, in response to receiving, via the user I/F 34, the instruction operation to cause the printer 30 to perform the user cleaning, the firmware 40 may determine that the instruction to perform the user cleaning has been received (S30: Yes). When determining that the instruction to perform the user cleaning has not been received (S30: No), the firmware 40 waits until the instruction to perform the user cleaning is received.

When determining that the instruction to perform the user cleaning has been received (S30: Yes), the firmware 40 proceeds to S31. In S31, the firmware 40 determines whether the printable number of sheets is more than a second threshold TH2. Specifically, the printable number of sheets is stored in the memory 36 of the printer 30. The firmware 40 compares the stored printable number of sheets with the second threshold T H2. In the first illustrative embodiment, the second threshold TH2 is set to "0", which is the same as the first threshold TH1. Namely, in S30, the firmware 40 determines whether the printable number of sheets is more than 0.

When determining that the printable number of sheets is more than the second threshold TH2 (S31: Yes), the firmware 40 proceeds to S34 to cause the printer 30 to perform the user cleaning. Meanwhile, when determining that the printable number of sheets is not more than the second threshold TH2 (i.e., the printable number of sheets is equal to or less than the second threshold TH2) (S31: No), the firmware 40 proceeds to S32. In S32, the firmware 40 determines whether the terminal 10 has accessed a purchase site where the user is allowed to purchase the charge number of sheets. This is because if the terminal 10 has already accessed the purchase site, the user is likely to purchase the charge number of sheets from the server 50 afterward. In other words, when it is determined that the terminal 10 has accessed the purchase site (S32: Yes), it is highly likely that the user purchases the charge number of sheets afterward and that the printable number of sheets reaches the second threshold TH2 accordingly. Specifically, the firmware 40 inquires of the terminal 10 whether the terminal 10 has already accessed the purchase site, and then makes a determination in S32 according to the result of the inquiry.

When determining that the terminal 10 has accessed the purchase site (S32: Yes), the firmware 40 proceeds to S34 to cause the printer 30 to perform the user cleaning. Meanwhile, when determining that the terminal 10 has not accessed the purchase site (S32: No), the firmware 40 proceeds to S33.

In S33, the firmware 40 determines whether conditions for starting periodic cleaning are satisfied. The periodic cleaning is a process of ejecting ink from the print head 38 to clean the print head 38 or performing the wipe operation for the print head 38 when a particular time has been reached or when a particular period of time has elapsed since the printer 30 was turned on. When determining that the conditions for starting periodic cleaning are not satisfied (S33: No), the firmware 40 goes back to S31. In this case, the user cleaning is put on hold until one of the requirements of S31 and S32 is satisfied. For instance, when the firmware 40 has received the charge instruction from the terminal 10 (S16 in FIG. 5) after the determination that the conditions for starting periodic cleaning are not satisfied (S33: No), the printable number of sheets may become more than the second threshold TH2 since the printable number of sheets increases by the charge number of sheets. In this case, the firmware 40 may determine that the printable number of sheets is more than the second threshold TH2 (S31: Yes) and may cause the printer 30 to perform the user cleaning (S34).

When determining that the conditions for starting periodic cleaning are satisfied (S33: Yes), the firmware 40 proceeds to S35 to perform the periodic cleaning. Then, in S36, the firmware 40 cancels the execution of the user cleaning currently on hold. This is because the print head 38 has been cleaned by the periodic cleaning, and there is no need to perform the user cleaning. After completion of S36, the firmware 40 terminates the process of FIG. 7.

The first illustrative embodiment as described above produces the following advantageous effects. When having received an instruction to perform the user cleaning, if the printable number of sheets is more than the second threshold TH2, the firmware 40 of the printer 30 performs the user cleaning. Meanwhile, if the printable number of sheets is equal to or less than the second threshold TH2, the firmware 40 restricts the execution of the user cleaning. Thereby, when the printable number of sheets is a value from which it is predicted that the number of pages printable by the printer 30 will be restricted, the firmware 40 restricts the execution of the user cleaning even though the firmware 40 has received an instruction to perform the user cleaning from the user. As a result, it is possible to prevent unnecessary consumption of ink by causing the printer 30 to properly perform the user cleaning.

The firmware 40 may accept the addition of the printable number of sheets. When the printable number of sheets is equal to or less than the second threshold TH2, the firmware 40 puts the execution of the user cleaning on hold. Then, when the printable number of sheets has become more than the second threshold TH2 after the purchase of the charge number of sheets, the firmware 40 performs the user cleaning. Thereby, it is possible to cause the printer 30 to perform the user cleaning as much as possible in a situation where the user cleaning is required.

To perform the periodic cleaning while the user cleaning is put on hold, the firmware 40 cancels the execution of the user cleaning on hold. Thereby, it is possible to prevent unnecessary consumption of ink due to execution of both the periodic cleaning and the user cleaning.

The second threshold TH2 is the same value as the first threshold TH1. Thereby, the user cleaning is restricted in a situation where the printer 30 is unable to perform printing due to an insufficient printable number of sheets. Hence, it is possible to prevent unnecessary consumption of ink.

In the first illustrative embodiment described above, the second threshold TH2 is set to "0." In another instance, the second threshold TH2 may be set to a value other than "0."

Second Illustrative Embodiment

In a second illustrative embodiment according to aspects of the present disclosure, different configurations and features from those in the aforementioned first illustrative embodiment will be mainly described. In the second illustrative embodiment, substantially the same elements as in the first illustrative embodiment will be provided with the same reference characters, and explanations thereof may be omitted.

In the aforementioned first illustrative embodiment, the second threshold TH2 is set to a fixed value (i.e., zero). Instead, in the second illustrative embodiment, the second threshold TH2 is set to a value variable depending on a usage status of the printer 30 used by the user.

Figure 8A:
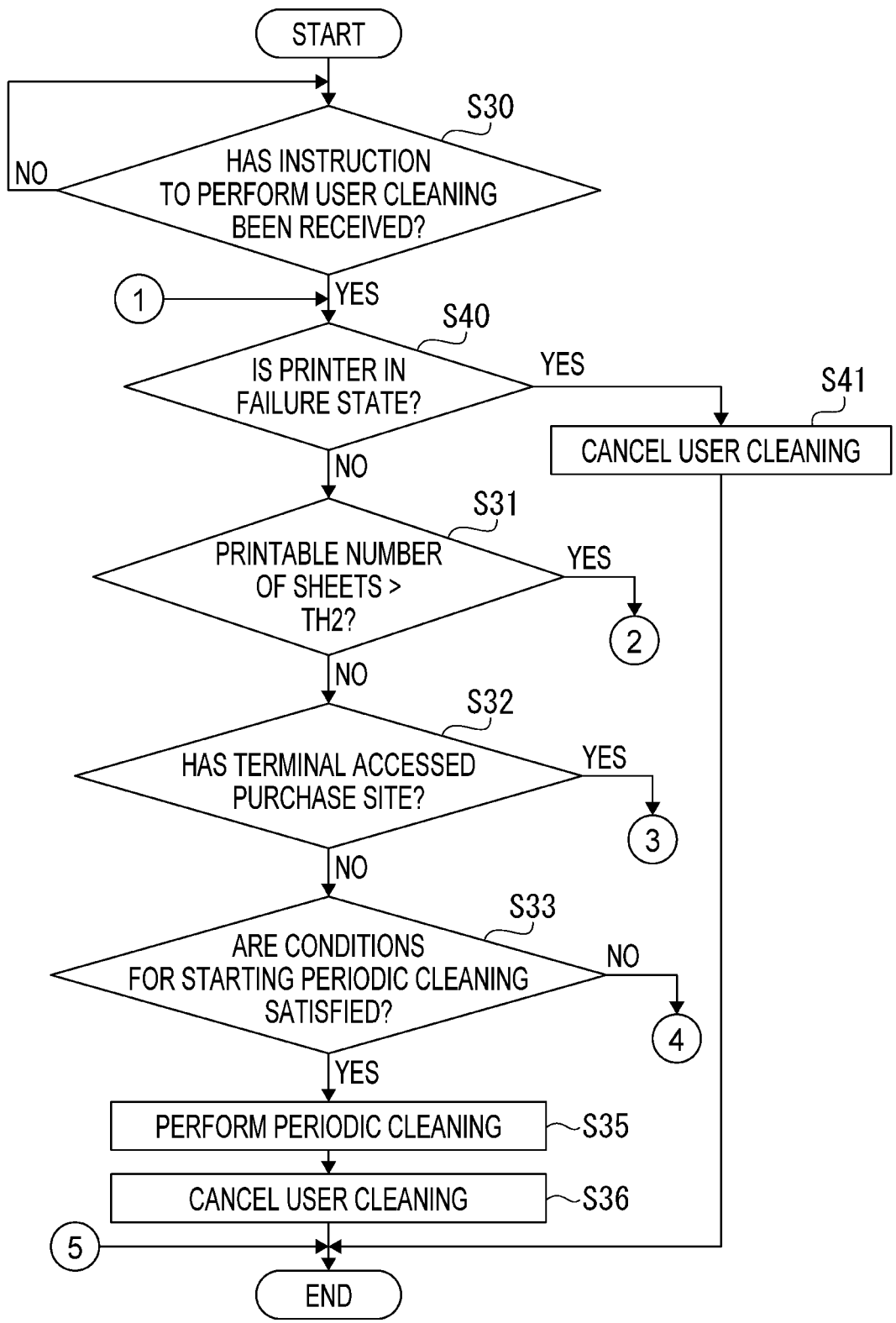
FIGS. 8A, 8B, and 8C are flowcharts showing a procedure of another process to be performed by the printer in response to receipt of an instruction to perform the user cleaning.
Figure 8B:
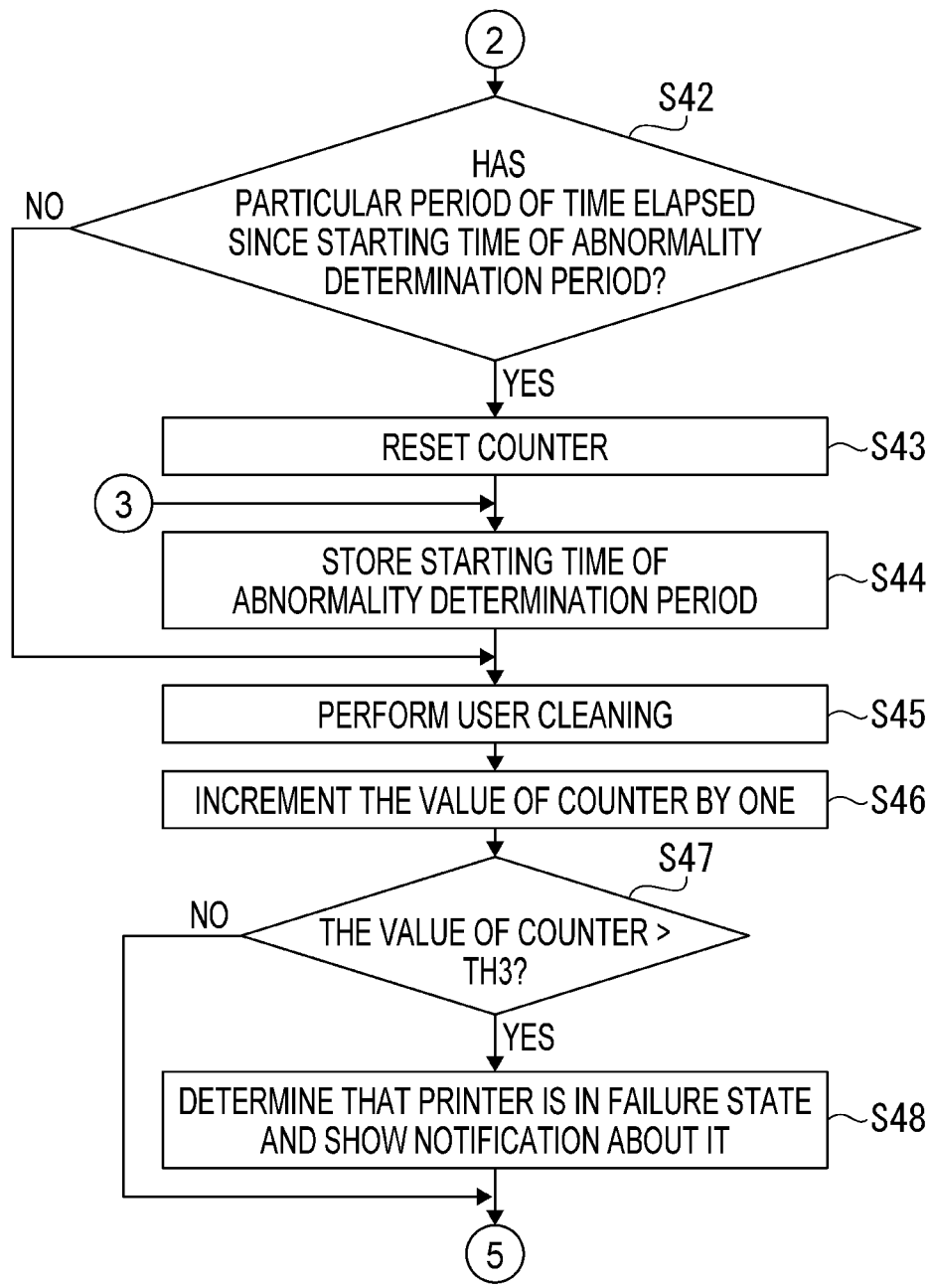
Figure 8C:
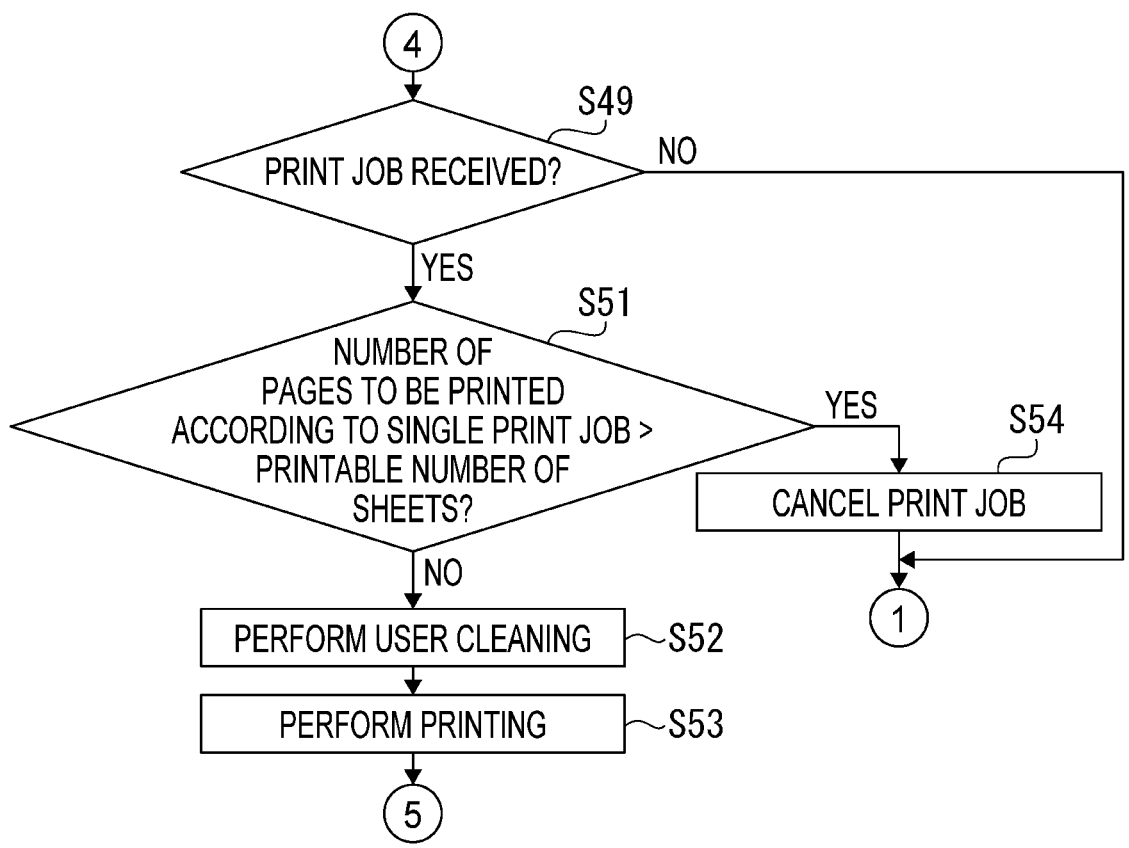

Referring to FIGS. 8A to 8C, a process to be performed by the firmware 40 when the printer 30 has received an instruction to perform the user cleaning in the second illustrative embodiment will be described.

In S30, the firmware 40 determines whether an instruction to perform the user cleaning has been received. When determining that an instruction to perform the user cleaning has been received (S30: Yes), the firmware 40 proceeds to S40. In S40, the firmware 40 determines whether the printer 30 is in a failure state. When determining that the printer 30 is in the failure state (S40: Yes), the firmware 40 proceeds to S41 to cancel the user cleaning. The determination in S40 as to whether the printer 30 is in the failure state is based on the result of a determination in a below-mentioned step S48. After completion of S41, the firmware 40 terminates the process shown in FIGS. 8A to 8C. This is because the printer 30 does not perform the user cleaning due to the printer 30 being in the failure state.

When determining that the printer 30 is not in the failure state (S40: No), the firmware 40 proceeds to S31. In S31, the firmware 40 determines whether the printable number of sheets is more than the second threshold TH2. In the second illustrative embodiment, the second threshold TH2 is set to a value variable depending on the usage status of the printer 30 used by the user. Specifically, the firmware 40 calculates an average value of the number of pages printed for each single job that is stored in the history information 43, and sets the calculated average value as the second threshold TH2. Therefore, in this case, the second threshold TH2 is equal to or more than one.

When determining that the printable number of sheets is more than the second threshold TH2 (S31: Yes), the firmware 40 proceeds to S42. In S42, the firmware 40 determines whether a particular period of time has elapsed since a starting time of a below-mentioned abnormality determination period. In the second illustrative embodiment, the firmware 40 determines whether the print head 38 is in an abnormal state, according to how many times the user cleaning has been performed during the abnormality determination period that is a predetermined period of time (see below-mentioned steps S42 to S48). Namely, the firmware 40 determines whether the print head 38 is in the abnormal state, based on how frequently the user cleaning has been performed.

When the starting time is not set, or when the particular period of time has elapsed since the starting time, the firmware 40 makes an affirmative determination in S42 (S42: Yes), and proceeds to S43. In S43, the firmware 40 resets the value of a counter. The counter is configured to count the number of times the user cleaning has been performed during the abnormality determination period. An initial value of the counter is zero. In S44, the firmware 40 stores the starting time of the abnormality determination period. In S45, the firmware 40 causes the printer 30 to perform the user cleaning.

In S46, the firmware 40 increments the value of the counter by one. In S47, the firmware 40 determines whether the value of the counter is more than an abnormality determination value TH3. The abnormality determination value TH3 is determined according to an estimated number of times the user cleaning is supposed to be performed during the abnormality determination period in a case where the print head 38 is in a failure state, for instance, due to nozzle clogging. When determining that the value of the counter is not more than the abnormality determination value TH3 (i.e., the value of the counter is equal to or less than the abnormality determination value TH3) (S47: No), the firmware 40 terminates the process shown in FIGS. 8A to 8C.

On the other hand, when determining that the value of the counter is more than the abnormality determination value TH3 (S47: Yes), the firmware 40 proceeds to S48. In S48, the firmware 40 determines that the printer 30 is in the failure state, and shows a notification about the failure state of the printer 30 on the touch panel 19. Then, the firmware 40 terminates the process shown in FIGS. 8A to 8C.

On the other hand, when determining that the printable number of sheets is not more than the second threshold TH2 (i.e., the printable number of sheets is equal to or less than the second threshold TH2 (S31: No), the firmware 40 proceeds to S32. In S32, the firmware 40 determines whether the terminal 10 has accessed the purchase site where the user is allowed to purchase the charge number of sheets. When determining that the terminal 10 has not accessed the purchase site (S32: No), the firmware 40 proceeds to S33. In S33, the firmware 40 determines whether the conditions for starting the periodic cleaning are satisfied.

When determining that the conditions for starting the periodic cleaning are not satisfied (S33: No), the firmware 40 proceeds to S49. Meanwhile, when determining that the conditions for starting the periodic cleaning are satisfied (S33: Yes), the firmware 40 proceeds to S35 to perform the periodic cleaning. Then, in S36, the firmware 40 cancels the user cleaning. After completion of S36, the firmware 40 terminates the process shown in FIGS. 8A to 8C. In S49, the firmware 40 determines whether a print job has been received from the terminal 10. When determining that a print job has not been received from the terminal 10 (S49: No), the firmware 40 goes back to S40. Meanwhile, when determining that a print job has been received from the terminal 10 (S49: Yes), the firmware 40 proceeds to SM (see FIG. 8C).

In S51, the firmware 40 determines whether the number of pages to be printed according to the single print job is more than the current printable number of sheets. In other words, the firmware 40 determines whether the current printable number of sheets is insufficient to complete printing of all the pages specified by the print job. When determining that the number of pages to be printed according to the single print job is equal to or less than the current printable number of sheets (S51: No), the firmware 40 proceeds to S52 to cause the printer 30 to perform the user cleaning on hold. This is to cause the printer 30 to print all the pages after performing the user cleaning to resolve the ink ejection failure of the print head 38. Meanwhile, when determining that the number of pages to be printed according to the single print job is more than the current printable number of sheets (S51: Yes), the firmware 40 proceeds to S54. In S54, the firmware 40 cancels the received print job. After completion of S54, the firmware 40 goes back to S40 in FIG. 8A. In this case, the user cleaning is continued to be put on hold.

After completion of S52, in S53, the firmware 40 causes the printer 30 to perform printing of all the pages specified by the print job. Then, the firmware 40 terminates the process shown in FIGS. 8A to 8C.

The second illustrative embodiment as described above produces the following advantageous effects. In a case where the printable number of sheets has reached the second threshold TH2, when a print job has been received, and the current printable number of sheets is sufficient to complete printing of all the pages to be printed according to the received print job, the firmware 40 causes the printer 30 to perform the user cleaning. Meanwhile, when the current printable number of sheets is insufficient to complete printing of all the pages to be printed according to the received print job, the firmware 40 does not cause the printer 30 to perform the user cleaning. Thus, when the current printable number of sheets is insufficient to complete printing of all the pages to be printed according to the received print job, the user cleaning is restricted. Thereby, the number of sheets printable according to the print job within the current printable number of sheets may be increased as much as possible. On the other hand, when the current printable number of sheets is sufficient to complete printing of all the pages to be printed according to the received print job, the user cleaning is not restricted. Thereby, it is possible to cause the printer to perform printing according to the user's intention.

The firmware 40 calculates the average number of pages printed per job (i.e., the average value of the number of pages printed for each single job) based on the history information 43, and sets the calculated average number of pages printed per job to the second threshold TH2. Thereby, it is possible to predict a situation in which printable pages are restricted according to the usage status of the printer 30 that represents how the printer 30 has been heretofore used by the user.

In such a situation that the user cleaning is frequently performed, it is highly likely that the print head 38 is malfunctioning, for instance, due to nozzle clogging. Therefore, the firmware 40 determines whether the print head 38 is in the abnormal state, based on how frequently the user cleaning has been performed. Thus, the firmware 40 provides a notification when determining that the print head 38 is in the abnormal state, thereby prompting the user to stop or cancel printing or to replace the printer 30.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

OTHER MODIFICATIONS

In the aforementioned illustrative embodiments, the printing system 100 employs the printable number of sheets as the print permission amount. Instead, other amounts (e.g., a usable amount of ink in the printing service, the number of ink ejectable times in the printing service, and a usable length of sheets in the printing service) may be employed as the print permission amount. In this case, in the second illustrative embodiment, the average value of the amount of ink used for each single job, of the number of ink ejection times for each single job, or of the length of sheets used for each single job may be calculated based on the history information 43. Then, the calculated average value may be set as the second threshold TH2.

In the aforementioned illustrative embodiments, the printable number of sheets is stored in the memory 36 of the printer 30. In another instance, the printable number of sheets may be stored in the memory 13 of the terminal 10, instead of being stored in the memory 36 of the printer 30. In this case, the firmware 40 may send to the terminal 10 a request for the current printable number of sheets in S31, thereby obtaining the printable number of sheets.

Figure 5:
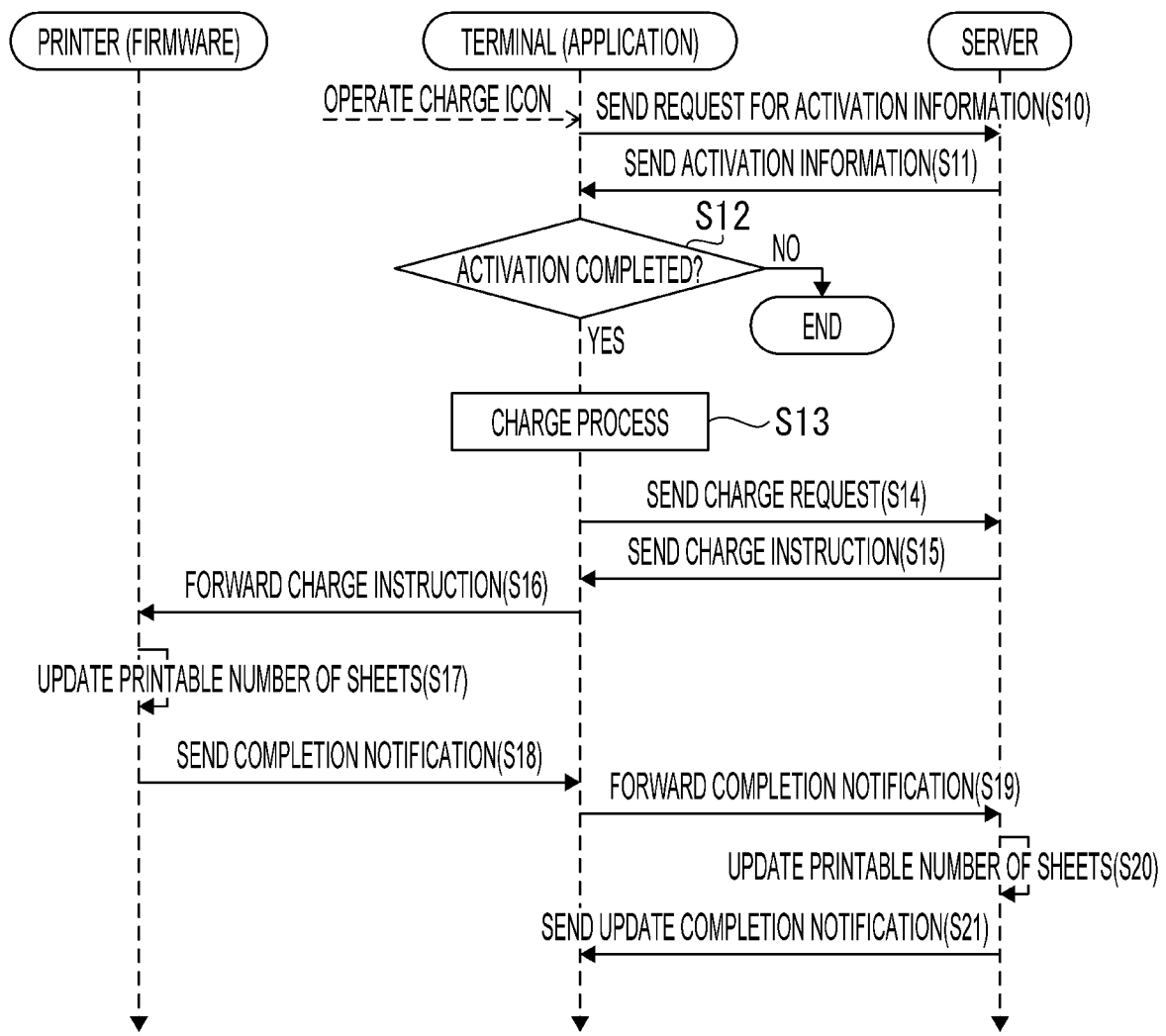
FIG. 5 is a timing chart showing a procedure to purchase a charge number of sheets.

In the process shown in FIG. 5, if it is stored in the printer 30 whether the activation of the printer 30 has been completed, the application 14 may send a request for the activation information to the printer 30 in S10. In this case, in reply to the request from the terminal 10, the firmware 40 may send the activation information to the terminal 10 in S11.

In the user management table KT1 shown in FIG. 2, the printable number of sheets is associated with each user ID. Instead, however, the printable number of sheets may be associated with each printer 30. In this case, each item registered in the user management table KT1 may be associated with each device ID of the device management table KT2.

In the aforementioned illustrative embodiments, the printer 30 has the ink tanks 37 that are unable to be re-filled with ink or be replaced. Instead, however, the printer 30 may have ink cartridges that are refillable with ink and replaceable. In this case, a request for replacement of an ink cartridge may be made to the vendor. The print engine 33 of the printer 30 may be an electrophotographic print engine configured to form a toner image on each photoconductive body and transfer the formed toner images onto a recording medium. In this case, the print engine 33 may be connected with toner cartridges to store toner, instead of the ink tanks 38.

The following shows examples of associations between elements exemplified in the aforementioned illustrative embodiments and modifications and elements according to aspects of the present disclosure. The printer 30 may be an example of a "printer" according to aspects of the present disclosure. The ink tanks 37 may be included in examples of a "container" according to aspects of the present disclosure. The print head 38 may be an example of a "print head" according to aspects of the present disclosure. The controller 35 may be an example of a "controller" according to aspects of the present disclosure. The printable number of sheets may be an example of a "print permission amount" according to aspects of the present disclosure. The charge number of sheets may be an example of an "additional print permission amount" according to aspects of the present disclosure. The memory 36 may be an example of a "memory" according to aspects of the present disclosure. The history information 43 may be an example of "history information" according to aspects of the present disclosure. The memory 36 storing the firmware 40 may be an example of a "non-transitory computer-readable medium" storing "computer-readable instructions" according to aspects of the present disclosure.

What is claimed is:
1. A printer comprising:
a container configured to store recording agent;
a print head configured to eject the recording agent; and
a processor configured to:
    permit the printer to perform printing until a permitted sheet quantity reaches a first sheet quantity threshold, where an initial permitted sheet quantity is granted after subscribing to a printing service and where the permitted sheet quantity decreases per sheet printed;

receive an instruction to perform user cleaning to clean the print head by ejecting the recording agent from the print head; and in response to the receipt of the instruction to perform the user cleaning, cause the printer to perform the user cleaning when the permitted sheet quantity has not reached a second sheet quantity threshold, whereas restricting execution of the user cleaning when the permitted sheet quantity has reached the second sheet quantity threshold.

2. The printer according to claim 1,
wherein the processor is further configured to:
put execution of the user cleaning on hold when the permitted sheet quantity has reached the second sheet quantity threshold;
receive an instruction to add an additional quantity of sheets to the permitted sheet quantity; and
after the additional quantity of sheets is added to the permitted sheet quantity in response to the receipt of the instruction to add the additional quantity of sheets, cause the printer to perform the user cleaning when the permitted sheet quantity has not reached the second sheet quantity threshold.

3. The printer according to claim 2,
wherein the processor is further configured to:
perform periodic cleaning to clean the print head by ejecting the recording agent from the print head when a particular time has been reached or when a particular period of time has elapsed; and
when the periodic cleaning has been started while the user cleaning is put on hold, cancel execution of the user cleaning on hold.

4. The printer according to claim 1,
wherein the processor is further configured to:
when the permitted sheet quantity has reached the second sheet quantity threshold, in response to receipt of a print job specifying pages to be printed, determine whether the permitted sheet quantity is a value with which the printer is allowed to complete printing of the specified pages to be printed;
perform the user cleaning when determining the permitted sheet quantity is a value with which the printer is allowed to complete printing of the specified pages to be printed; and
not perform the user cleaning when determining the permitted sheet quantity is a value with which the printer is unable to complete printing of the specified pages to be printed.

5. The printer according to claim 1, further comprising a memory configured to store history information, the history information containing a count of pages printed for each single job,
wherein the processor is further configured to:
calculate an average value of the count of pages printed for each single job based on the history information; and
set the calculated average value as the second sheet quantity threshold.

6. The printer according to claim 1,
wherein the processor is further configured to:
determine whether the print head is in an abnormal state, based on how frequently the user cleaning has been performed; and
provide a notification when determining that the print head is in the abnormal state.

7. The printer according to claim 1,
wherein the second sheet quantity threshold is identical to the first sheet quantity threshold.

8. The printer according to claim 1, wherein the permitted sheet quantity is increasable according to an operation on a user terminal.

9. A non-transitory computer-readable medium storing computer-readable instructions that are executable by a processor of a printer comprising a container configured to store recording agent, and a print head configured to eject the recording agent, the computer-readable instructions being configured to, when executed by the processor, cause the processor to:
permit the printer to perform printing until a permitted sheet quantity reaches a first sheet quantity threshold, where an initial permitted sheet quantity is granted after subscribing to a printing service and where the permitted sheet quantity decreases per sheet printed;
receive an instruction to perform user cleaning to clean the print head by ejecting the recording agent from the print head; and
in response to the receipt of the instruction to perform the user cleaning, cause the printer to perform the user cleaning when the permitted sheet quantity has not reached a second sheet quantity threshold, whereas restricting execution of the user cleaning when the permitted sheet quantity has reached the second sheet quantity threshold.

10. The non-transitory computer-readable medium according to claim 9, wherein the permitted sheet quantity is increasable according to an operation on a user terminal.

11. A method implementable on a processor of a printer comprising a container configured to store recording agent, and a print head configured to eject the recording agent, the method comprising:
permitting the printer to perform printing until a permitted sheet quantity reaches a first sheet quantity threshold, where an initial permitted sheet quantity is granted after subscribing to a printing service and where the permitted sheet quantity decreases per sheet printed;
receiving an instruction to perform user cleaning to clean the print head by ejecting the recording agent from the print head; and
in response to the receipt of the instruction to perform the user cleaning, causing the printer to perform the user cleaning when the permitted sheet quantity has not reached a second sheet quantity threshold, whereas restricting execution of the user cleaning when the permitted sheet quantity has reached the second sheet quantity threshold.

12. The method of claim 11, wherein the permitted sheet quantity is increasable according to an operation on a user terminal.

* * * * *